United States Patent
Canessa et al.

(10) Patent No.: US 9,292,501 B2
(45) Date of Patent: Mar. 22, 2016

(54) PROCESS AND A SYSTEM FOR UPDATING A DATA STRUCTURE IN A RELATIONAL DATABASE USED WITHIN A MANUFACTURING EXECUTION SYSTEM

(75) Inventors: Francesca Canessa, Genoa (IT); Luca Costanzo, Genoa (IT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 1442 days.

(21) Appl. No.: 12/543,853

(22) Filed: Aug. 19, 2009

(65) Prior Publication Data

US 2010/0049724 A1    Feb. 25, 2010

(30) Foreign Application Priority Data

Aug. 19, 2008    (EP) .................................... 08014702

(51) Int. Cl.
*G06F 7/00* (2006.01)
*G06F 17/30* (2006.01)
*G06F 11/34* (2006.01)

(52) U.S. Cl.
CPC ............ *G06F 17/30* (2013.01); *G06F 11/3495* (2013.01)

(58) Field of Classification Search
USPC ........... 707/610, 705, 825, 954, 999.102, 756
See application file for complete search history.

(56) References Cited

U.S. PATENT DOCUMENTS

| | | | |
|---|---|---|---|
| 6,216,136 B1 | 4/2001 | Ronström | |
| 6,609,133 B2 | 8/2003 | Ng et al. | |
| 6,708,185 B2* | 3/2004 | Harris | |
| 6,880,016 B1* | 4/2005 | Van Der Heijden | G06Q 10/107 709/230 |
| 6,904,424 B1* | 6/2005 | Gusler et al. | |
| 7,003,367 B2* | 2/2006 | Cheng | G05B 19/41865 700/121 |
| 7,231,267 B2* | 6/2007 | Bournas | G06F 8/20 700/104 |
| 7,280,885 B1* | 10/2007 | Brown | G05B 19/41865 700/121 |
| 2002/0188622 A1* | 12/2002 | Wallen | G05B 19/4097 |
| 2003/0212654 A1* | 11/2003 | Harper | G06Q 30/02 |
| 2003/0217053 A1* | 11/2003 | Bachman | G05B 19/41865 |
| 2004/0073404 A1* | 4/2004 | Brooks | G05B 19/409 702/183 |
| 2004/0078373 A1* | 4/2004 | Ghoneimy et al. | 707/10 |
| 2004/0139070 A1* | 7/2004 | Dysart et al. | 707/3 |
| 2004/0148287 A1* | 7/2004 | Manion et al. | 707/10 |
| 2006/0149706 A1* | 7/2006 | Prang et al. | 707/2 |
| 2006/0195436 A1 | 8/2006 | Levesque et al. | |
| 2008/0141237 A1* | 6/2008 | Elad | G06F 8/67 717/171 |
| 2008/0228783 A1* | 9/2008 | Moffat | G06F 17/30241 |
| 2009/0217240 A1* | 8/2009 | Motoyama | G06F 11/0709 717/114 |

FOREIGN PATENT DOCUMENTS

| | | |
|---|---|---|
| WO | 9904351 A2 | 1/1999 |
| WO | 9932996 A1 | 7/1999 |

* cited by examiner

*Primary Examiner* — Eliyah S Harper
(74) *Attorney, Agent, or Firm* — Laurence Greenberg; Werner Stemer; Ralph Locher

(57) ABSTRACT

A process for updating a data structure in a relational database used within a manufacturing execution system, contain the steps of defining within the database the data structure and defining SQL scripts having specific rules. The rules contain a header describing an initial data structure and a final data structure, thereby defining each of the defined SQL scripts as a section of the updating process. The current data structure of the database is analyzed and the required sections among the sections available are identified by comparing the current data structure of the database to the initial data structure defined in the header of the SQL script. A sequence order to apply the sections is defined and the required SQL scripts are run according to the defined sequence order. This allows developers to define the SQL script for their own demands without coordinating the requested changes with other development groups.

6 Claims, 1 Drawing Sheet

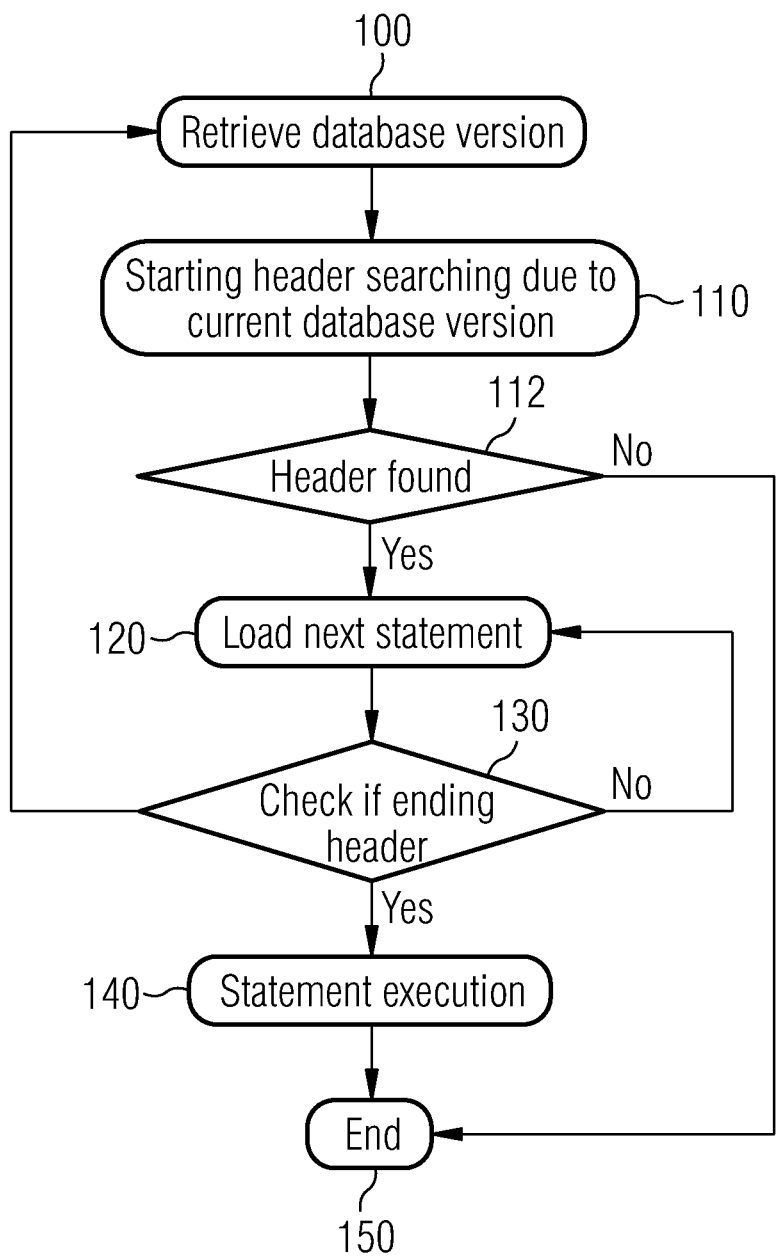

PROCESS AND A SYSTEM FOR UPDATING A DATA STRUCTURE IN A RELATIONAL DATABASE USED WITHIN A MANUFACTURING EXECUTION SYSTEM

CROSS-REFERENCE TO RELATED APPLICATION

This application claims the priority, under 35 U.S.C. §119, of European application EP 08 014 702.8, filed Aug. 19, 2008; the prior application is herewith incorporated by reference in its entirety.

BACKGROUND OF THE INVENTION

Field of the Invention

The present invention relates to a process and a system for updating a data structure in a relational database used within a manufacturing execution system (MES).

In the world of process automation and process monitoring standard automation systems for controlling the widest conceivable variety of machines and plants are state of the art. Such technology covers in particular a broad range of products which are offered by Siemens Corporation under its SIMATIC product family within the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context a broad range of IT solutions exist to connect the actual hardware close to the technical and/or logistical process to the application layer of the client driving the installation. Manufacturing execution systems have therefore been developed to meet all of the requirements of a service-oriented architecture (SOA) to integrate seamless into a totally integrated automation (TIA). A plug & play architecture, in which the individual functions can be easily combined and configured with each other thereby forms the basis for this success thereby simplifying the complex structures of controlling a manufacturing plant or the like.

In MES software applications relational databases are broadly used not only to store data stemming from the production process, but also, and even more attributed, to store configuration data, application data and system data.

A new version of an MES product may imply, and in general it does imply, modifications in the global structure of the data base in terms of structural changes in existing tables and/or of addition of new tables. Moreover, many application servers of the same product are not only sharing the Database Management System, but they also share the same table in the database so that it often occurs that modifications in the data structure will be requested by more than one development group on the same item at the same time.

When a new version of the MES product is delivered to the customer, it is mandatory to provide a method to upgrade also the database preserving all existing data and safeguarding the consistency between old and new data. A further issue causing very often serious upgrading problems is the fact that a customer who requires a version update updates his version not from the direct previously one.

So far, the problem has been solved in a way that, as many groups may affect the database structure, each group creates a script containing the command sequence capable to upgrade the database structure according to the needs under preserving already present data. Once all the scripts are available, they must be merged in a unique script that also has to solve any possible conflict and has to deliver at the end a self-consistent script which renders the complete process heavily money-consuming and resource-consuming.

SUMMARY OF THE INVENTION

It is accordingly an object of the invention to provide a process and a system for updating a data structure in a relational database used within a manufacturing execution system which overcomes the above-mentioned disadvantages of the prior art devices of this general type, which requires less investment in money and resources at better quality of the update process.

The aim is achieved according to the present invention by a process for updating a data structure in a relational database used within a manufacturing execution system. The process contains the steps of defining within the database the data structure and defining SQL scripts having a number of specific rules. The rules contain a header describing an initial data structure and a final data structure, thereby defining each of the defined SQL scripts as a section of the updating process. The current data structure of the database is analyzed and the required sections among the sections available are identified by comparing the current data structure of the database to the initial data structure defined in the header of the SQL script. A sequence order to consistently apply the sections is defined and the required SQL scripts are run according to the defined sequence order of the sections.

The method and the system now allow for the developers to define the SQL script for their own demands without being obliged to coordinate the requested changes with other development groups. The need of the post-processing phase to merge all scripts in a single self-consistent script has been rendered obsolete. There, the development of the data structure in the relational databases can be made incrementally. Therefore, it is not sensitive to the developer which version are currently valid but he has just to develop only the "delta" between two versions. In this way, the scripts are rather simple to be designed to be debugged which tremendously reduces efforts and costs. This system guarantees to update for example a database in a persistent way from version 1 to version 4 within one shot. For the user, the invention provides significant improvement during the upgrading process. The need to perform a step-by-step update from the original version to the most recent one has also been rendered obsolete. Further, the user does not require to contact the software supplier in order to obtain all required intermediate scripts.

Other features which are considered as characteristic for the invention are set forth in the appended claims.

Although the invention is illustrated and described herein as embodied in a process and a system for updating a data structure in a relational database used within a manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a flow chart illustrating a database structure upgrading process according to the invention.

DETAILED DESCRIPTION OF THE INVENTION

Referring now to the single FIGURE of the drawing in detail, there is shown a basic flowchart of a data base structure upgrading process. A pre-requisite for the present method is, of course, the presence of SQL scripts containing the rules for the amendments of the database structure. The defined SQL scripts have a number of specific rules, whereby the rules contain a header describing an initial and a final data structure of the database. Each of the defined SQL scripts is now considered as a section of the updating process, which might be applied later on, if necessary. For that reason, the specific method first requires that the current database version has to be retrieved, step 100. The next step 110 now identifies the required sections among the sections available for the update/upgrade of the database structure. This identification is performed by searching in the header of the available headers contained within the respective SQL scripts for a header whose initial data structure of the database is equal to the current data structure of the database. This comparison cancels those SQL scripts as an updating/upgrading section for which a match of the initial structure of the header and the current structure of the database could not have been achieved. In case that no matching header could have been found in step 112, the updating process is immediately terminated. In the positive case of step 112, the process is progressed to the next identification by loading the next header statements, step 120, for the comparison whether the final data structure of the database according to a preceding SQL script now matches with the initial data structure in one the remaining headers. As long as a new matching header will be found the process at step 130 denies the presence of a last matching header and the process is returned to step 120. When the step 130 turns out to be positive, no further matching header among the headers in the available SQL scripts could have been found. The process now proceeds to step 140 in which a sequence order is defined to consistently apply the sections and the so-determined and required SQL scripts according to the defined sequence order of the sections are executed. After the execution of the last SQL script according to the defined sequence order of the section, the process terminates at 150.

The process to identify the defined sequence order of the sections to be applied is therefore preferably a process which is checking the initial data structure defined in the header of each sections available against the current data structure; and which is assigning the final data structure of the section for which a match between the initial data structure and the current data structure has been achieved to be the current data structure and repeating the step of checking the current data structure against the initial data structure until no further match can be achieved.

In order to avoid a mismatch of the data structure in the case of a match of more than one section within the checking step, the matching sections are applied subsequently thereby controlling whether the sections will change the data structure in an ambiguous way.

For that reason, the current version of the existing database can have any structure within a chain from an original structure and intermediate update structures and the latest designed structure. The process is insofar self-operating since the header definitions in the SQL scripts easily allow to be compared against the present structure of the database, usually referred to as database version and the sequence of the sections can be easily deducted from this comparison.

The invention claimed is:

1. A process for updating a data structure in a relational database used within a manufacturing execution system, which comprises the steps of:
   a) defining within the relational database the data structure;
   b) defining SQL scripts having a number of specific rules, the rules containing a header describing an initial data structure and a final data structure, thereby defining each of the defined SQL scripts as a section of an updating process;
   c) analyzing a current data structure of the relational database;
   d) identifying required sections among the sections available by comparing the current data structure of the relational database to the initial data structure defined in the header of a SQL script;
   e) defining a sequence order to consistently apply the sections; and
   f) running required SQL scripts according to a defined sequence order of the sections.

2. The process according to claim 1, wherein the step e) further comprises the steps of:
   e1) checking the initial data structure defined in the header of each of the sections available against the current data structure; and
   e2) assigning the final data structure of the section for which a match between the initial data structure and the current data structure has been achieved to be the current data structure and repeating the step of checking the current data structure against the initial data structure until no further match can be achieved.

3. The process according to claim 2, wherein in case of a match of more than one section within the checking step, the matching sections are applied subsequently thereby controlling whether the sections will change the data structure in an ambiguous way.

4. A system for updating a data structure in a relational database used within a manufacturing execution system, the system comprising:
   the relational database having a defined data structure;
   means for defining SQL scripts having a number of specific rules, said specific rules containing a header describing an initial data structure and a final data structure, thereby defining each of the defined SQL scripts as a section of an updating system;
   means for analyzing a current data structure of the relational database;
   means for identifying required sections among the sections available by comparing the current data structure of the relational database to the initial data structure defined in the header of the SQL script;
   means for defining a sequence order to consistently apply the sections; and
   means for running required SQL scripts according to a defined sequence order of the sections.

5. The system according to claim 4, wherein the means for defining the sequence order is further enabled to:
   check the initial data structure defined in the header of each of the sections available against the current data structure; and
   assign the final data structure of the section for which a match between the initial data structure and the current data structure has been achieved to be the current data structure and repeating the step of checking the current data structure against the initial data structure until no further match can be achieved.

6. The system according to claim 4, further comprising further means such that in a case of a match of more than one section within the checking, the matching sections are applied subsequently thereby controlling whether the sections will change the data structure in an ambiguous way.

\* \* \* \* \*